(12) United States Patent
Graffin

(10) Patent No.: US 9,409,729 B2
(45) Date of Patent: Aug. 9, 2016

(54) INSTALLATION FOR TRANSPORTING CONTAINERS

(71) Applicant: Serac Group, La Ferte Bernard (FR)

(72) Inventor: Andre Jean Jacques Graffin, Winfield, IL (US)

(73) Assignee: SERAC GROUP, La Ferte Bernard (FR)

( * ) Notice: Subject to any disclaimer, the term of this patent is extended or adjusted under 35 U.S.C. 154(b) by 0 days.

(21) Appl. No.: 14/790,777

(22) Filed: Jul. 2, 2015

(65) Prior Publication Data

US 2016/0001987 A1 Jan. 7, 2016

(30) Foreign Application Priority Data

Jul. 2, 2014 (FR) ...................................... 14 56345

(51) Int. Cl.
*B65G 47/84* (2006.01)
*B65G 47/86* (2006.01)

(52) U.S. Cl.
CPC ...... *B65G 47/847* (2013.01); *B65G 2201/0247* (2013.01)

(58) Field of Classification Search
CPC .... B65G 29/00; B65G 47/846; B65G 47/847; B65G 47/90; B65G 2201/0244; B65G 2201/0247
USPC .................................. 198/459.2, 608, 803.14
See application file for complete search history.

(56) References Cited

U.S. PATENT DOCUMENTS

| 6,213,309 B1* | 4/2001 | Dadisho ................. B07C 5/362 198/450 |
| 6,692,050 B2* | 2/2004 | Graffin ................... B65G 29/00 198/803.7 |
| 2010/0314219 A1* | 12/2010 | Carmichael ............ B65G 29/00 198/470.1 |
| 2014/0318079 A1* | 10/2014 | Gruson .................. B65G 47/52 53/266.1 |

FOREIGN PATENT DOCUMENTS

| DE | 101 46 118 a1 | 4/2003 |
| JP | 2007 176661 A | 7/2007 |
| JP | 2009 286533 A | 12/2009 |

\* cited by examiner

*Primary Examiner* — Leslie A Nicholson, III
*Assistant Examiner* — Keith R Campbell
(74) *Attorney, Agent, or Firm* — Muncy, Geissler, Olds & Lowe, P.C.

(57) ABSTRACT

An installation for transporting containers, the installation comprising a rotary platform (1, 2) provided in its periphery with slots (7.1, 7.2), a jaw (8.1, 8.2) being mounted on the platform in the vicinity of each slot in order to be movable between a closed position for holding a container in the slot and an open position. Each jaw comprises a resilient element (9.1, 9.2) having a portion (9.11, 9.21) fastened to the platform in the vicinity of the slot in order to have a free end (9.12, 9.22) that extends facing the slot and that is elastically deformable between a rest state in which the free end co-operates with a side wall of the slot to define a section smaller than the cross-section of the neck, and a deformed state in which the free end cooperates with the side wall of the slot to define a section greater than the cross-section of the neck.

10 Claims, 5 Drawing Sheets

INSTALLATION FOR TRANSPORTING CONTAINERS

The present invention relates to transporting containers, particularly in a line for processing said containers.

A container processing line, e.g. a filling line, comprises a plurality of stations and in particular a cleaning and/or sterilizing station, a filling station proper, and a container closing station. In order to increase rates of throughput, the containers are processed while they are being moved by means of an installation for transporting containers along the line.

Such a transport installation, generally comprises a succession of rotary platforms, each provided with means for holding containers on the platform. The holding means are assemblies of parts and generally comprise clamps selectively controlled to occupy an open position or a closed position by means of actuators such as pneumatic or electromagnetic jacks, or indeed wheels carried by the clamps for co-operating with stationary cams.

This results in a structure that is relatively complex, thereby increasing the cost of installations and making the transport installation difficult to clean.

An object of the invention is to provide an installation for transporting containers that is simpler.

To this end, the invention provides an installation for transporting containers, the installation comprising a rotary platform provided in its periphery with slots, each defined by a lateral wall and for receiving a portion of a container. A jaw is mounted on the platform in the vicinity of each slot in order to be movable between a closed position for holding a container in the slot, and an open position. Each jaw comprises a resilient element having a portion fastened to the platform in the vicinity of the slot in order to have a free end that extends facing the slot and that is elastically deformable between a rest state in which the free end co-operates with the side wall of the slot to define a section smaller than the cross-section of the portion of the container, and a deformed state in which the free end co-operates with the side wall of the slot to define a section greater than the cross-section of the portion of the container.

Thus, the jaws are extremely simple in structure. A jaw is not hinged to pivot between its two positions, rather it is the deformation of the resilient element that enables the free end to move. This makes it possible to reduce the cost of fabricating laws, to make them easier to clean, and to increase reliability.

Other characteristics and advantages of the invention appear on reading the following description of particular, non-limiting embodiments of the invention.

Reference is made to the accompanying drawings, in which.

Figure 1:
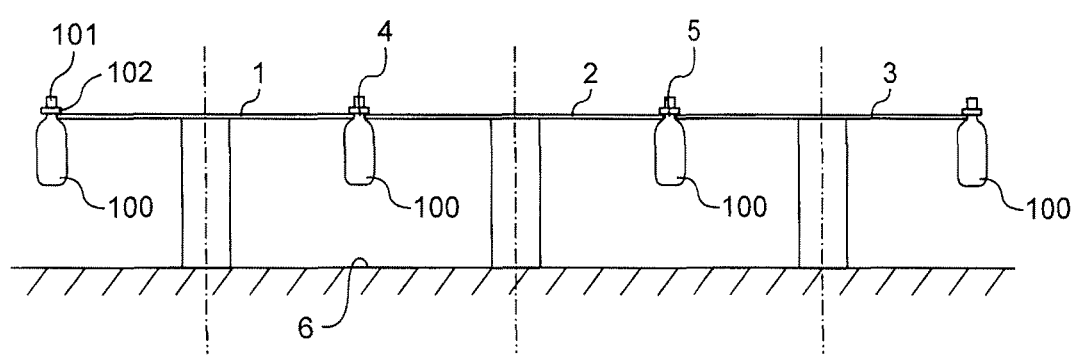
FIG. 1 is a diagrammatic elevation view of a transport installation of the invention.
Figure 2:
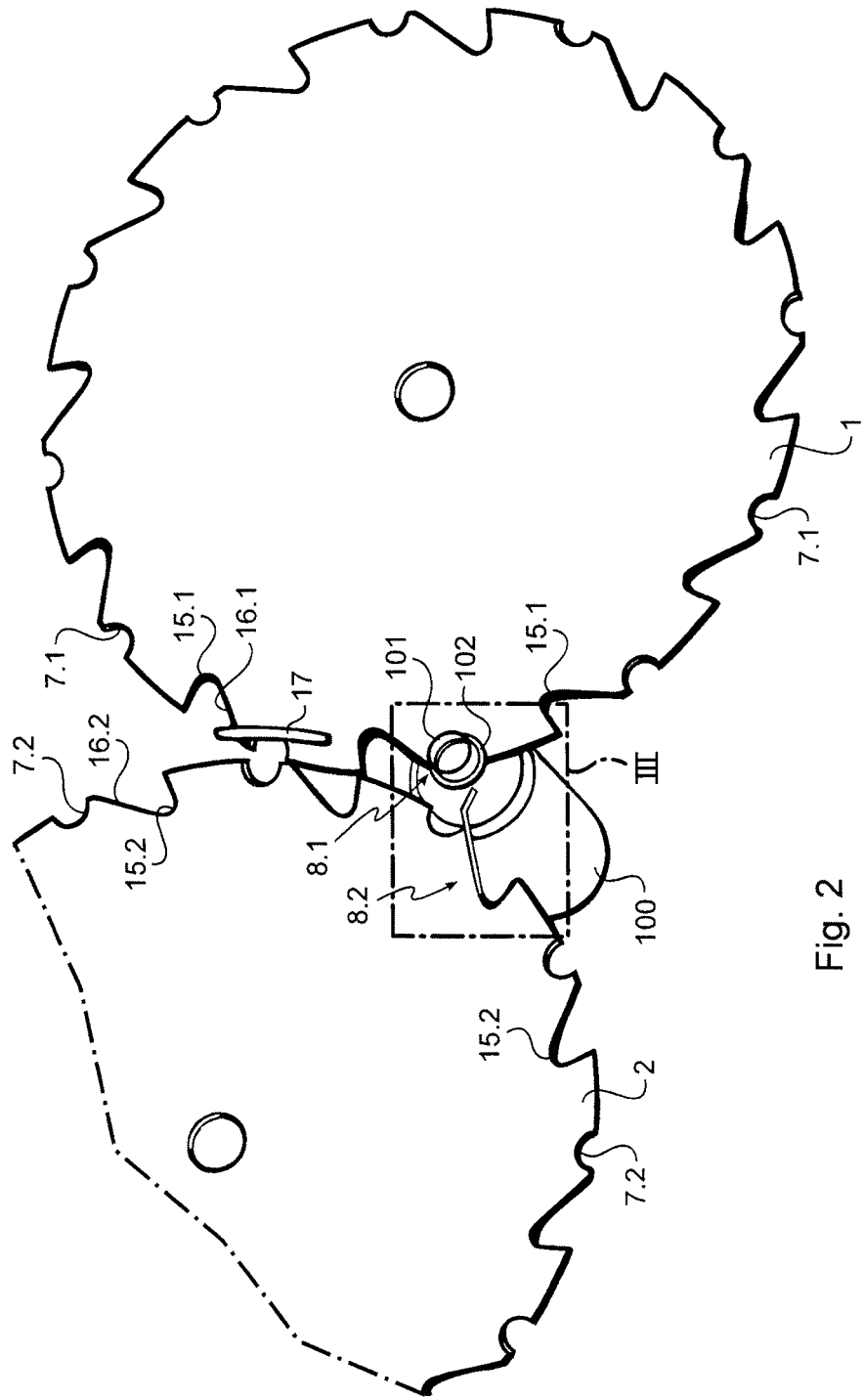
FIG. 2 is a diagrammatic perspective view of a transport installation of the invention.
Figure 3:
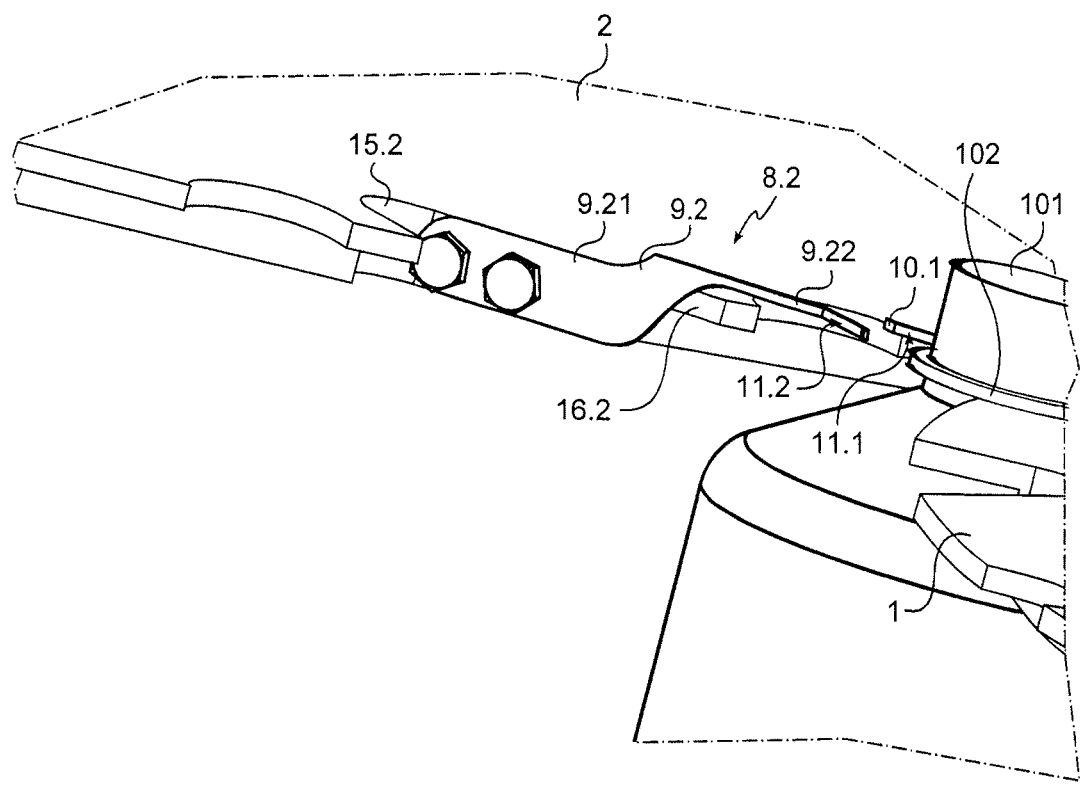
FIG. 3 is a diagrammatic perspective and side view of zone III of FIG. 2.
Figure 4:
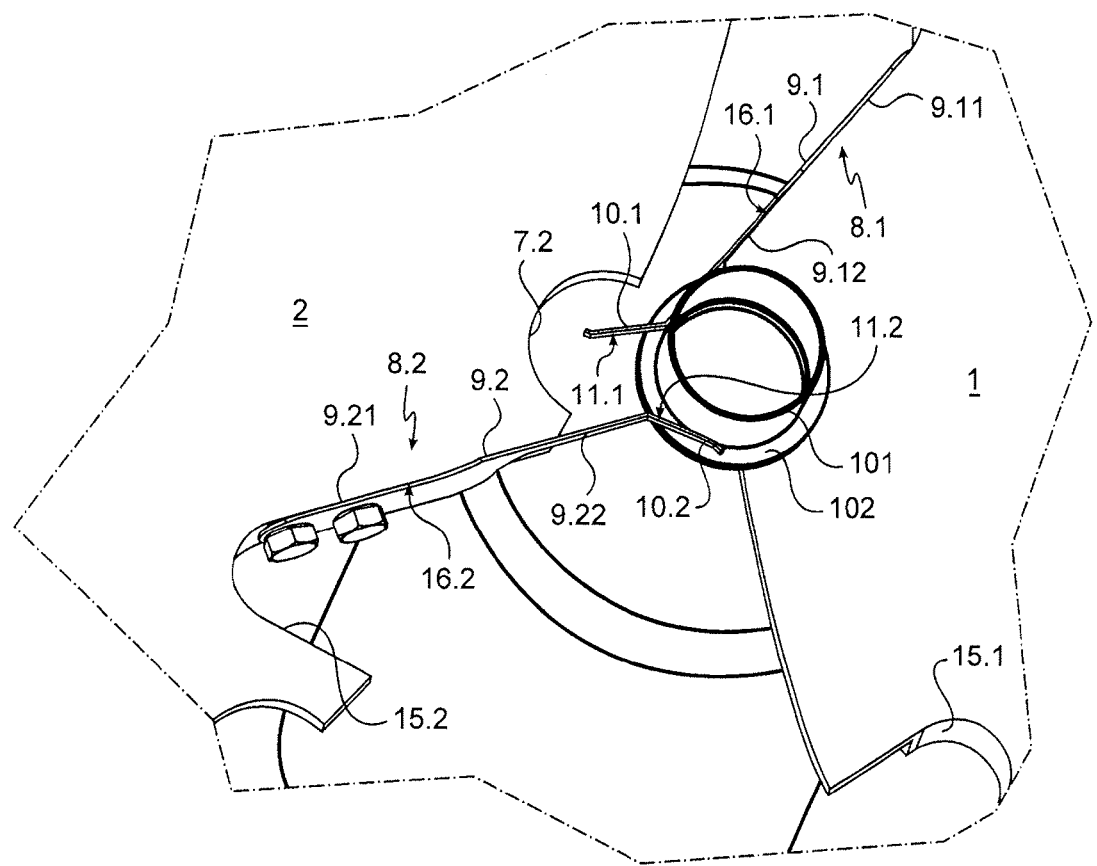
FIGS. 4 and 5 are diagrammatic fragmentary views of the installation shown in perspective and seen from above, showing stages in the transfer of a container between two platforms of the installation.
Figure 5:
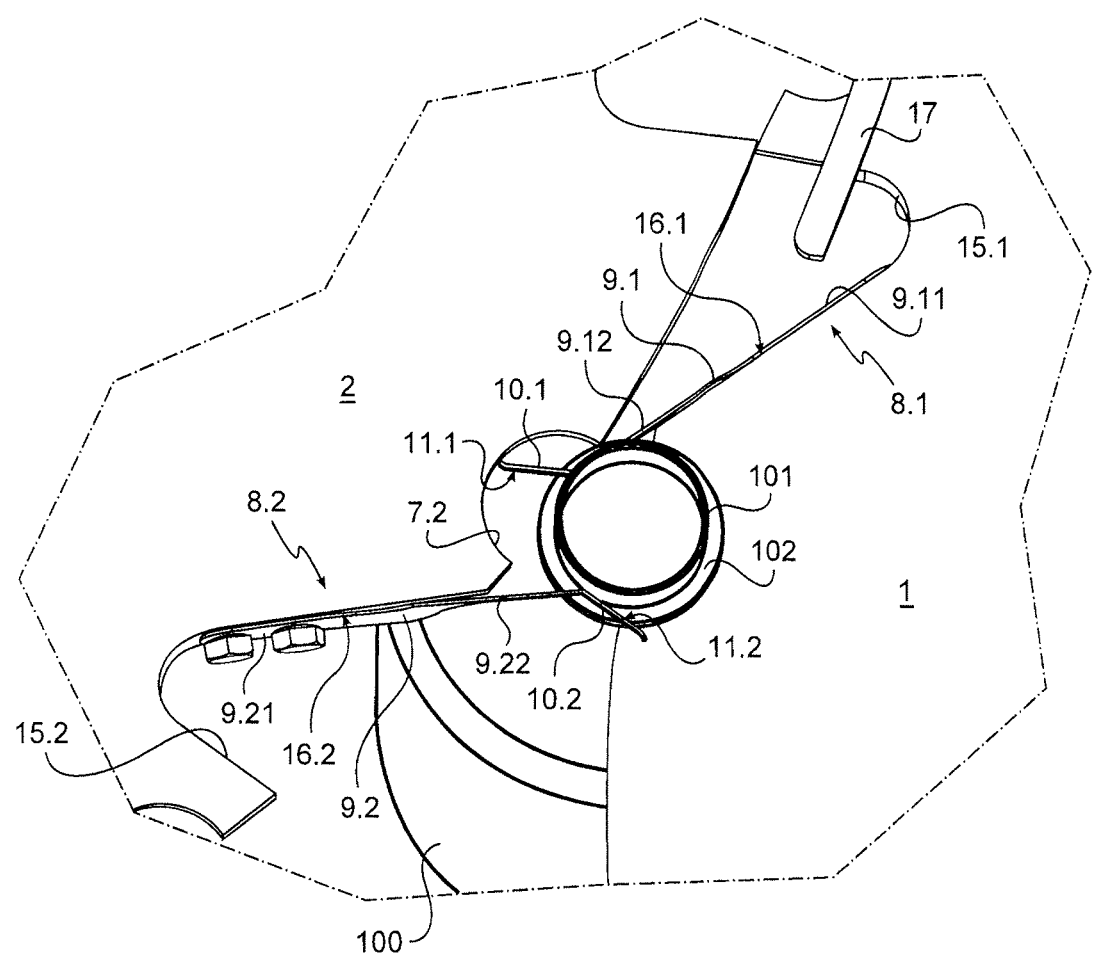

With reference to the figures, the transport installation of the invention is described herein in application to processing containers 100 each having a neck 101 provided, with a collar 102 projecting laterally from the neck 101.

The transport installation of the invention comprises an upstream platform 1, an intermediate platform 2 that is tangential to the upstream platform 1 at a point of tangency 4, and a downstream platform 3 that is tangential to the intermediate platform 2 at a point of tangency 5. The platforms 1, 2, and 3 are mounted on a structure 6 so as to rotate. The transport installation also has a device for loading containers 100 on the upstream platform 1 and a device for discharging containers 100 from the downstream platform 3. These devices are themselves known and are therefore not described in detail herein.

The upstream platform 1 and the intermediate platform 2 are both provided with peripheral slots 7.1, 7.2. Each slot 7.1, 7.2 is constituted by a notch defined by a circularly arcuate side wall extending over a little less than 180° and having a radius that is slightly greater than the radius of the neck 101 in order to receive a portion of the neck 101, the collar 102 of said neck 101 resting on the portion of the top surface of the platform 1, 2 bordering the slot 7.1, 7.2.

In the vicinity of each slot 7.1, 7.2, a jaw given general reference 8.1, 8.2 is mounted to move between a closed position for holding a container in the slot. 7.1, 7.2 and an open position for inserting the neck 101 of a container 100 into the slot 7.1, 7.2 and for extracting the neck 101 of the container 100 from the slot 7.1, 7.2 (it should be observed that only one jaw 8.1 and only one jaw 8.2 are shown in the figures to avoid overcrowding them). Each jaw 8.1 extends downstream from the slot 7.1 with which it is associated, over the upstream platform 1, and each jaw 8.2 extends upstream from the slot 7.2 with which it is associated on the intermediate platform 2.

Each jaw 8.1, 8.2 includes a resilient element 9.1, 9.2 having a portion 9.11, 9.21 fastened to the platform in the vicinity of the slot 7.1, 7.2 in order to have a free end 9.12, 9.22 that extends facing the side wall of the slot 7.1, 7.2 and that is elastically deformable between a rest state in which the free end 9.12, 9.22 cooperates with the side wall of the slot 7.1, 7.2 to define a section smaller than the cross-section of the neck 101, and a deformed state in which the free end 9.12, 9.22 co-operates with the side wall of the slot 7.1, 7.2 to define a section slightly greater than the cross-section of the neck 101. When a neck 101 is received in the slot 7.1, 7.2 with which the resilient element 9.1, 9.2 is associated, the resilient element 9.1, 9.2 is in an intermediate state in which it exerts a resilient force against a portion of the neck 101 received in the slot 7.1, 7.2 extending under the collar 102, which force presses the neck 101 against the side wall of the slot 7.1, 7.2. The resilient element 9.1, 9.2 in this example is made of metal, and more particularly out of stainless steel.

More precisely, the portion 9.11, 9.21 of the resilient element 9.1, 9.2 that is fastened to the platform 1, 2 presents, in this example, the shape of a blade having opposite main faces with a smaller dimension that can be measured in a substantially vertical direction. In order to fasten each resilient element 9.1, 9.2, the platforms 1, 2 are provided with peripheral notches 15.1, 15.2 that are substantially V-shaped, each having a non-radial vertical plane 16.1, 16.2 extending towards the slot 7.1, 7.2 corresponding to the resilient element 9.1, 9.2, in order to have an edge adjacent to the outer circumference of the platform and to the slot 7.1, 7.2 corresponding to the resilient element 9.1, 9.2. Each of the portions 9.11, 9.12 is screw-fastened.

The free end 9.12, 9.22 is rod-shaped and includes a terminal portion 10.1, 10.2 that projects from an outer circumference of the platform 1, 2 and that carries a contact surface 11.1, 11.2. The terminal portion 10.1, 10.2 is a plastically deformed portion of the free end 9.1, 9.2. The terminal portion 10.1, 10.2 is arranged in such a manner that, when the free end 9.21, 9.22 is in its rest state, the contact surface 11.1, 11.2 points towards a portion of the slot 7.1, 7.2 opposite from the portion 9.11, 9.12, forming a substantially acute angle with a general direction in which the resilient element 9.1, 9.2 extends, and tangential to the platform at this location. Thus, when the neck 101 is brought towards the slot. 7.1, 7.2 in order to be inserted therein, it pushes against the contact surface 11.1, 11.2 at the free end 9.21, 9.22 and brings the resilient, element. 9.1, 9.2 towards its deformed state. Once the neck 101 has been received in the slot 7.1, 7.2, the resilient element 9.1, 9.2 bears against the neck 101 under the collar 102 via an intermediate portion situated between the terminal portion 10.1, 10.2 and the portion 9.11, 9.21 fastened to the platform 1, 2.

The installation has a rail 17 extending downstream relative to the travel direction of the containers 100 from the point of tangency between the upstream and intermediate platforms 1 and 2 in order to keep the containers on the intermediate, platform 2 until the containers 100 are disengaged from the jaws 8.1 of the upstream platform 1. In this example, the rail 17 is substantially in the form of a circular arc centered on the center of rotation of the intermediate platform 2.

There follows a description of how one of the containers 100 is transported.

The container 100 begins by being loaded in conventional manner into a slot 7.1 of the upstream platform 1 while the corresponding jaw 8.1 is initially closed, i.e. the resilient, element 9.1 is in its rest state. When the neck 101 is inserted into the slot 7.1, it pushes against the contact surface 11.1 and brings the resilient element 9.1 of the jaw 8.1 from its rest state into its deformed state (corresponding to the open position), by opposing the return force that results from the resilience of the resilient element 9.1. Once the contact surface 11.1 has been passed, the neck 101 is received in the slot 7.1, and the resilience of the resilient element 9.1 returns the resilient element 9.1 towards its rest state and keeps it in the intermediate state pressing against the neck 101 so as to oppose escape of the neck 101 from the slot 7.1.

A little upstream from the point of tangency 4, the slot 7.1 comes to face a slot 7.2 having its jaw 8.2 initially in the closed, position, i.e. the resilient element 9.2 is in its rest state. As the slot 7.1, 7.2 approach the point of tangency 4, the neck 101 comes into contact with the contact surface 11.2 of the resilient element 9.2 of said jaw 8.2 and takes it towards its open position by deforming the resilient element 9.2. The neck 101 is inserted progressively into the slot 7.2 as a result of the platforms 1, 2 rotating towards the point of tangency. At the point of tangency 4, the neck 101 is received in both facing slots 7.1, 7.2 and the resilience of the resilient element 9.1, 9.2 keep the neck in the respective slots 7.1 and 7.2. On leaving the point of tangency 4, the neck 101 comes into contact with the rail 17, which keeps the neck 101 in the slot 7.2 of the intermediate platform 2. The neck 101 then pushes against the resilient element 9.1 of the jaw 8.1 and brings the jaw 8.1 into the open position acting against the return force of the resilient element 9.1. The container 100 is thus discharged from the upstream platform 1 and taken into charge by the intermediate platform 2. The resilience of the resilient element 9.1 returns it to its rest state as soon as the neck 101 is no longer in contact with the terminal portion 10.1.

Containers are transferred from the intermediate platform 2 to the downstream platform 3 as follows. In this example, the downstream platform 3 has clamps, each of which is controlled to take hold of the neck of a container 100 received in a slot 7.2 facing the clamps at the point of tangency 5. Once the point of tangency 5 has been passed, the clamp moves away from the slot 7.2 as a result of the platforms 2 and 3 rotating and it pulls the container 100 so that its neck 101 forces the jaw 8.2 to open. Thus, when the neck 101 is discharged from the slot 7.2, it pushes against the free end 10.2 and brings the resilient element 9.2 into its deformed state. The resilience of the resilient element 9.2 returns it to its rest state as soon as the neck 101 is no longer in contact with the terminal portion 10.2

The containers are discharged from the downstream platform 3 in conventional manner.

Naturally, the invention is not limited to the embodiments described but covers any variant coming within the ambit of the invention as defined by the claims.

In particular, the upstream and/or downstream platforms may be of a structure different from that described, and they may include control clamps or jaws such as those described.

It should be observed that the shape of the blade in the portions 9.11, 9.12 of the resilient element 9.1, 9.2 makes it easier to fasten to the platform 1, 2 (by means of screws passing through said portion), but this portion may have some other shape, and for example it may be wire-shaped. In the same manner, although the free end 9.12, 9.22 is wire-shaped, it could have some other shape, for example it could be blade-shaped.

The resilient element 9.1, 9.2 may be made as a single part or as a plurality of parts, e.g. two parts that are welded together.

The resilient, element 9.1, 9.2 may be fastened directly to the platform 1, 2 or it may be fastened to a part that is in turn fastened to the platform 1, 2. The resilient element 9.1, 9.2 may be fastened against a peripheral lateral surface of the platform 1, 2 or against a top or bottom surface of the platform 1, 2.

The containers 100 may be supported by a portion other than the collar 102 (the containers need not have collars).

The invention claimed is:

1. An installation for transporting containers, the installation comprising a rotary platform provided in its periphery with slots, each defined by a lateral wall and for receiving a portion of a container, a jaw being mounted on the platform in the vicinity of each slot in order to be movable between a closed position for holding a container in the slot and an open position, the installation being characterized in that each jaw comprises a resilient element having a portion fastened to the platform in the vicinity of the slot in order to have a free end that extends facing the slot and that is elastically deformable between a rest state in which the free end co-operates with the side wall of the slot to define a section smaller than the cross-section of the portion of the container, and a deformed state in which the free end co-operates with the side wall of the slot to define a section greater than the cross-section of the portion of the container.

2. An installation according to claim 1, wherein the portion of the resilient element that is fastened to the platform is in the form of a blade having main faces on a substantially vertical plane and their main axis in a direction that is substantially horizontal.

3. An installation according to claim 1, wherein the free end of the resilient element is in the form of a rod.

4. An installation according to any preceding claim, wherein the platform is an intermediate platform bordered by a feed unit for bringing containers into the slots and the free end of each resilient element includes a contact surface towards a portion of the slot opposite from the portion of the resilient element fastened to the platform, forming an angle that is substantially acute relative to a general direction of the resilient element of the slot when the free end is in its rest state in such a manner that, when the container portion is inserted in the slot, it pushes against the contact surface of the free end and brings the resilient element towards its deformed state.

5. An installation according to claim 4, wherein the free end has a terminal portion that projects transversely from an outer circumference of the platform and that carries the contact surface, the resilient element bearing against the container portion received in the slot via an intermediate portion situated between the terminal portion and the portion fastened to the platform.

6. An installation according to claim 5, wherein the terminal portion is a plastically deformed portion of the free end.

7. An installation according to claim 4, wherein the feed unit is an upstream rotary platform that possesses means for holding containers on the upstream platform and that is tangential to the intermediate platform at a point of tangency.

8. An installation according to claim 7, wherein the upstream platform is provided, with slots and jaws forming holding means, each jaw extending downstream from the slot with which it is associated on the upstream platform or upstream from the slot with which it is associated on the intermediate platform, and a rail extending substantially downstream from the point of tangency of the platforms relative to the travel direction of the containers in order to keep the containers on the intermediate platform until the containers are disengaged from the holding means of the upstream platform.

9. An installation according to any one of claims 1 to 3 or anyone of claims 5 to 8, wherein the platform is bordered by a discharge unit for discharging containers from the slots, and the discharge unit is arranged to take each container and to extract the container portion away from the slot in such a manner that when the container portion is discharged from the slot it pushes against the free end and brings the resilient element into its deformed state.

10. An installation according to any one of claims 1 to 3, wherein the platform is an intermediate platform bordered on one side by a feed unit for bringing containers into the slots and the free end of each resilient element includes a contact surface towards a portion of the slot opposite from the portion of the resilient element fastened to the platform, forming an angle that is substantially acute relative to a general direction of the resilient element of the slot when the free end is in its rest state in such a manner that, when the container portion is inserted in the slot, it pushes against the contact surface of the free end and brings the resilient element towards its deformed state; and on the other side by a discharge unit for discharging containers from the slots, and the discharge unit is arranged to take each container and to extract the container portion away from the slot in such a manner that when the container portion is discharged from the slot it pushes against the free end and brings the resilient element into its deformed state.

\* \* \* \* \*